(12) United States Patent
Huang et al.

(10) Patent No.: US 12,228,726 B1
(45) Date of Patent: Feb. 18, 2025

(54) LENS GROUP, AND NEAR-TO-EYE DISPLAY DEVICE

(71) Applicant: Interface Advanced Technology (Chengdu) Co., Ltd., Chengdu (CN)

(72) Inventors: Shang-Yu Huang, Hsinchu (TW); Yu-Mei Kuo, New Taipei (TW)

(73) Assignee: Interface Advanced Technology (Chengdu) Co., Ltd., Chengdu (CN)

( * ) Notice: Subject to any disclaimer, the term of this patent is extended or adjusted under 35 U.S.C. 154(b) by 0 days.

(21) Appl. No.: 18/661,034

(22) Filed: May 10, 2024

Related U.S. Application Data (63) Continuation-in-part of application No. PCT/CN2023/138540, filed on Dec. 13, 2023.

(30) Foreign Application Priority Data

Dec. 8, 2023 (CN) .......................... 202311695784.X (51) Int. Cl.
*G02B 25/00* (2006.01)

(52) U.S. Cl.
CPC .................. *G02B 25/001* (2013.01)

(58) Field of Classification Search
CPC .................................................. G02B 25/001
USPC .................. 359/643, 644, 715, 741, 771
See application file for complete search history.

(56) References Cited

U.S. PATENT DOCUMENTS 11,719,936 B2  8/2023  He et al.

FOREIGN PATENT DOCUMENTS

| CN | 114236828 A | 3/2022 |
| CN | 115280216 A | 11/2022 |
| CN | 117075337 A | 11/2023 |
| CN | 117270220 B | * 4/2024 |

OTHER PUBLICATIONS

CN 117270220 B (Year: 2024).*

* cited by examiner

*Primary Examiner* — William Choi
(74) *Attorney, Agent, or Firm* — ScienBiziP, P.C.

(57) ABSTRACT

A lens groups includes a first lens, a transflective film, a second lens, a composite film, a third lens and a fourth lens arranged in sequence. The first lens includes a first surface and a second surface. The second lens comprises a third surface and a fourth surface, the third surface faces to the second surface. The transflective film is attached to the third surface and the composite film is attached to the fourth surface. The composite film includes a phase retardation layer and a reflective polarizing layer, and the phase retardation layer is attached to the fourth surface. The third lens includes a fifth surface and a sixth surface, the fifth surface faces to the fourth surface. The fourth lens comprises a seventh surface and an eighth surface, the seventh surface faces to the sixth surface. A near-to-eye display device is further disclosed.

20 Claims, 8 Drawing Sheets

LENS GROUP, AND NEAR-TO-EYE DISPLAY DEVICE

FIELD

The subject matter herein relates to lens groups, and near-to-eye display devices.

BACKGROUND

Pixels per degree (PPD), also known as angular resolution, is usually used to judge a spatial resolution of the near-to-eye display devices. Existing near-to-eye display devices with lens groups for folding the optical path multiple times can only reach about 20 PPD, while the resolution of human eyes recognition limit is about 60 PPD. A folded optical path allows an optics footprint reduction.

As a result, users will observe distinct pixel particles when using a near-eye display device. In order to achieve a higher resolution, both the resolution of the display screen and the resolution of lens groups need to be improved. Due to limitations of a curvature of a single lens and limitations of the bonding process between lenses, existing near-to-eye display devices which use two or three lenses for folding the optical path usually cannot achieve the desired resolution.

Therefore, there is room for improvement within the art.

BRIEF DESCRIPTION OF THE DRAWINGS

Implementations of the present disclosure will now be described, by way of embodiment, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

"Optional" or "optionally" means that the subsequently described circumstance may or may not occur, so that the description includes instances where the circumstance occurs and instances where it does not.

"Above" means one layer is located on top of another layer. In one example, it means one layer is situated directly on top of another layer. In another example, it means one layer is situated over the second layer with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached or coupled to the other feature or element or intervening features or elements may be present.

Figure 1:
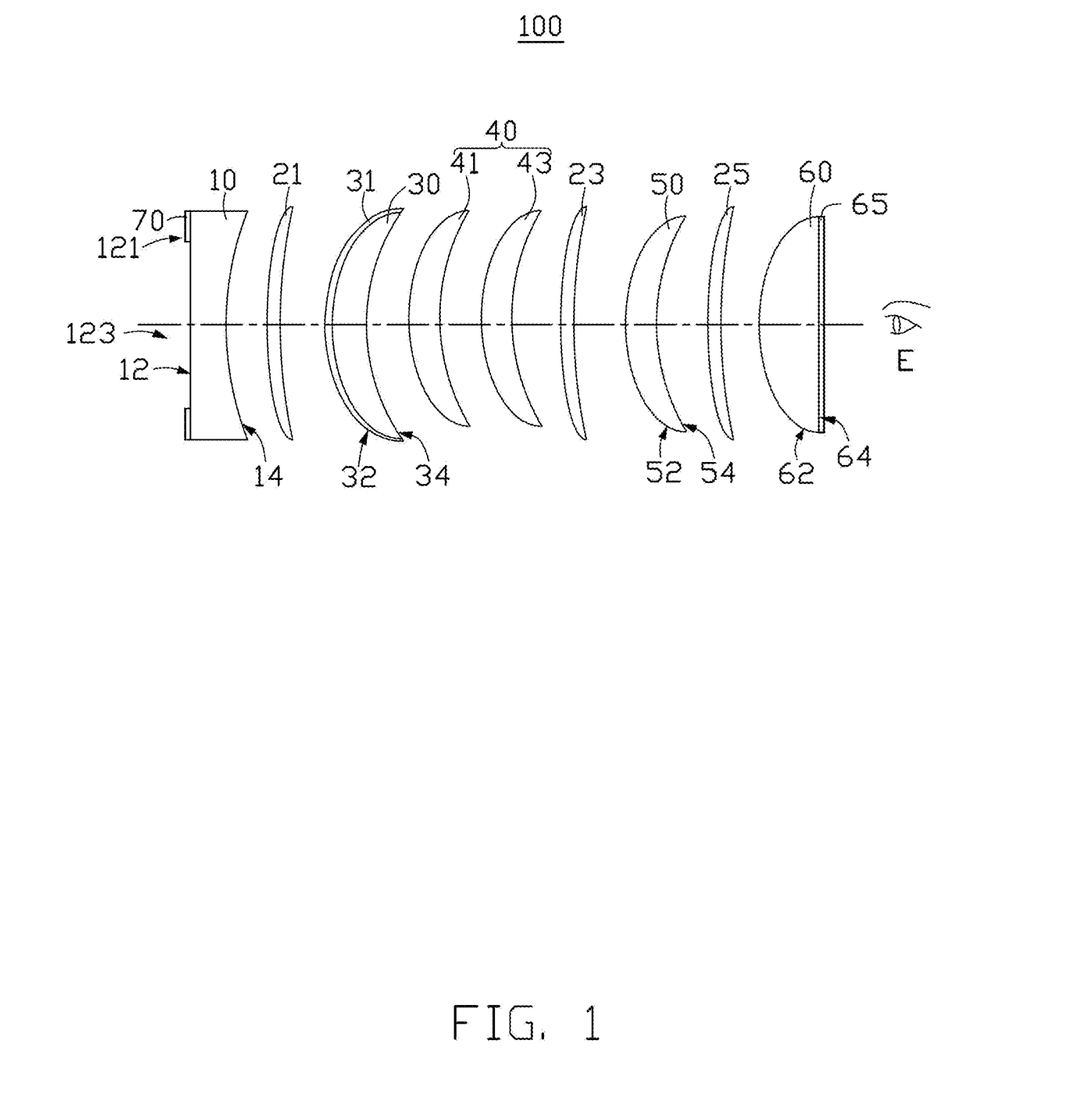
FIG. 1 illustrates an embodiment of a lens group according to the present disclosure.

FIG. 1 illustrates a lens group 100 according to an embodiment of the present disclosure. The lens group 100 includes a first lens 10, a transflective film 31, a second lens 30, a composite film 40, a third lens 50, and a fourth lens 60. The first lens 10 includes a first surface 12 and a second surface 14. The second lens 30 includes a third surface 32 and a fourth surface 34. The third surface 32 faces the second surface 14. The transflective film 31 is attached to the third surface 32. The composite film 40 is attached to the fourth surface 34. The composite film 40 includes a phase retardation layer 41 and a reflective polarizing layer 43. The phase retardation layer 41 is between the fourth surface 34 and the reflective polarizing layer 43. The third lens 50 includes a fifth surface 52 and a sixth surface 54, the fifth surface 52 faces the composite film 40. The fourth lens 60 includes a seventh surface 62 and an eighth surface 64, the seventh surface 62 faces the sixth surface 54.

The transflective film 31 is used to transmit a part of emitting light and reflective the other part of the emitting light. In this embodiment, half of the emitting light is transmitted. In this embodiment, the phase retardation layer 41 is a quarter wave plate, a polarization of the emitting light incident on the phase retardation layer 41 is changed. The reflective polarizing layer 43 reflects the emitting light with a first linear polarization state, and transmits the emitting light with a second linear polarization state.

Figure 2:
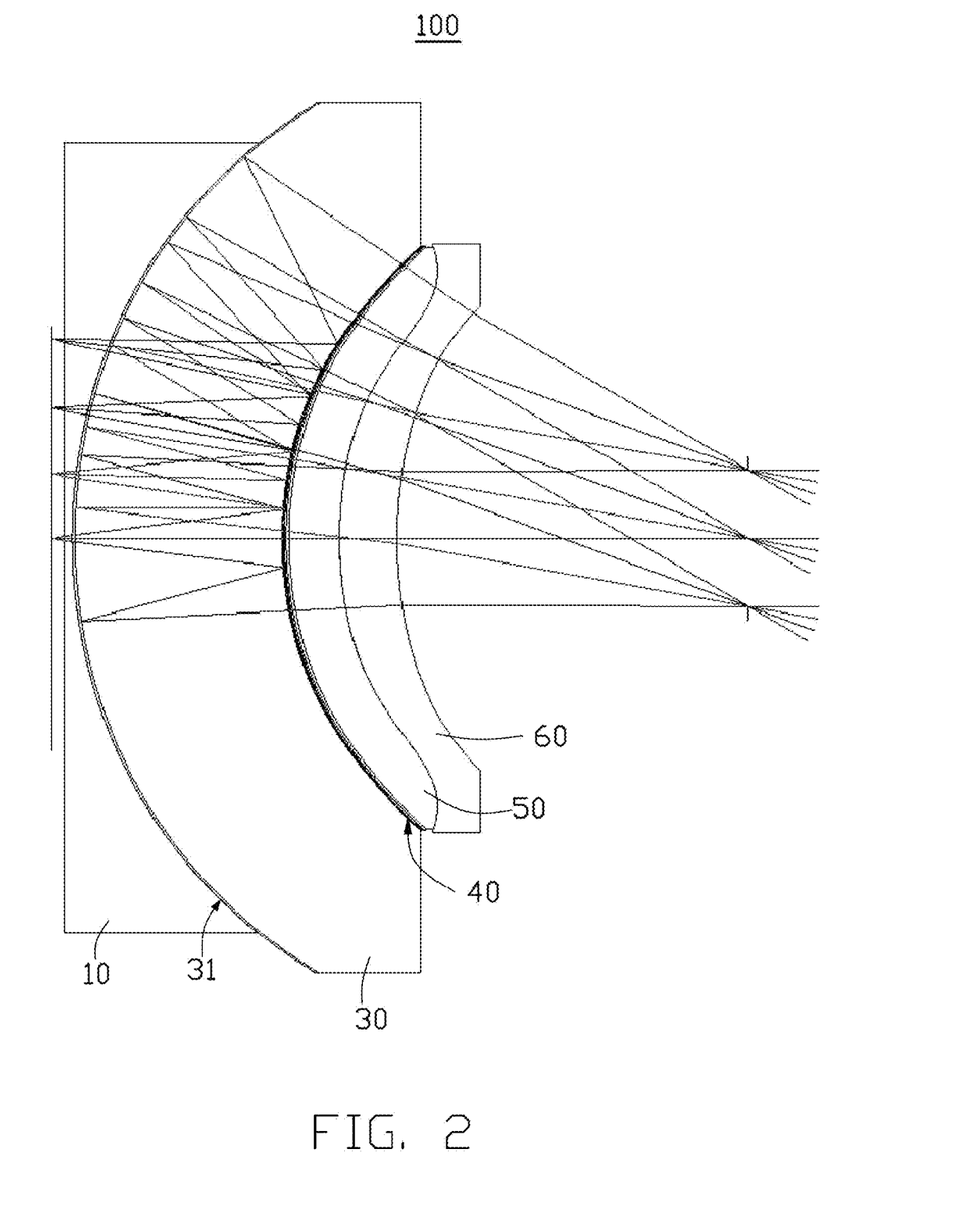
FIG. 2 illustrates an embodiment of optical paths of a lens group according to the present disclosure.

FIG. 2 illustrates optical paths of image light emitting to the lens group 100 according to the embodiment of the present disclosure. The first lens 10 receives the image light of a first circular polarization state, and transmits the image light to the transflective film 31. The fourth lens 60 receives the image light passing through the second lens 30 and the third lens 50, then transmit the image light to a human eye E.

Please see FIG. 1 again, specifically, the image light incident into the lens group 100 from the first surface 12. After passing through the transflective film 31, half of the energy of the image light transmits from the transflective film 31 and passes through the second lens 30 to incident on the composite film 40. The phase retardation layer 41 transfers the image light from the first circular polarization state to a first linear polarization state. The reflective polarizing layer 43 reflects the image light with the first linear polarization state. The image light passes through the phase retardation layer 41 and be transferred to the first circular polarization state. The transflective film 31 reflects half of the image light (that is, the energy of the image light at this time is one-fourth of that before incident on the lens group 100) emits from the direction of the composite film 40, and transfers the image from the first circular polarization state to a second circular polarization. The phase retardation layer 41 transfers the image light from the second circular polarization state to a second linear polarization state. The reflective polarizing layer 43 transmits the image light with the second linear polarization state to the third lens 50. The image light passes through the third lens 50 and the fourth lens 60, and then incident to the human eye E.

In this embodiment, the first surface 12 is a planar surface. A transmittance area 121 and a shading area 123 are defined on the first surface 12. The transmittance area 121 transmits the image light, and a shading layer 70 sets on the shading area 123 to block stray light. Specifically, the transmittance area 121 is arranged on a central region of the first surface 12. The shading area 123 is arranged on a surrounding region of the first surface 12, that is, the shading area 123 surrounds the transmittance area 121. The shading layer 70 is made by blackened metallic material or other black materials to block the stray light other than the image light. In other embodiments, the first surface 12 can also be a curve surface.

A refractive index of each of the first lens 10, the second lens 30, the third lens 50, and the fourth lens 60 is selected from a range of 1.46-1.58. Specifically, all the refractive indexes of the first lens 10, the second lens 30, the third lens 50, and the fourth lens 60 are equivalent to each other. For example, a value of the refractive index can be any value selected from any range of 1.46-1.48, 1.48-1.5, 1.5-1.52, 1.52-1.54, 1.54-1.56, and 1.56-1.58.

The lens group 100 further includes a first adhesive layer 21, a second adhesive layer 23, and a third adhesive layer 25. The first adhesive layer 21 is set between the first lens 10 and the transflective film 31 to bond the first lens 10 and the second lens 30 coated with the transflective film 31. The second adhesive layer 23 is set between the composite film 40 and the third lens 50 to bond the second lens 30 coated with the composite film 40 and the third lens 50. The third adhesive layer 25 is set between the third lens 50 and the fourth lens 60 to bond the third lens 50 and the fourth lens 60.

The first adhesive layer 21, the second adhesive layer 23, and the third adhesive layer 25 can be formed of transparent adhesive materials such as optical adhesives or liquid optical adhesives. The surface shapes of the second surface 14 and the third surface 32 can be inconsistent, and a gap between the first lens 10 and the second lens 30 can be filled by the first adhesive layer 21. The surface shapes of the fourth surface 34 and the fifth surface 52 can be inconsistent, and a gap between the second lens 30 and the third lens 50 can be filled by the second adhesive layer 23. The surface shapes of the sixth surface 54 and the seventh surface 62 can be inconsistent, and a gap between the third lens 50 and the fourth lens 60 can be filled by the third adhesive layer 25.

The surface shapes of the first lens 10, the second lens 30, the third lens 50 and the fourth lens 60 bonded by the first adhesive layer 21, the second adhesive layer 23 and the third adhesive layer 25 can be inconsistent, and a gap between any two surfaces is filled by the adhesive.

A refractive index of each of the first adhesive layer 21, the second adhesive layer 23 and the third adhesive layer 25 is selected from a range of 1.45-1.7. Specifically, all the refractive indexes of the first adhesive layer 21, the second adhesive layer 23 and the third adhesive layer 25 are equivalent to each other. And a value of the refractive index can be any value selected from any range of 1.45-1.46, 1.46-1.48, 1.48-1.5, 1.5-1.52, 1.52-1.54, 1.54-1.56, −1.56-1.58, 1.58-1.6, 1.6-1.62, 1.62-1.64, 1.64-1.66, 1.66-1.68 and 1.68-1.7.

In this embodiment, surfaces of the first lens 10, the third lens 50, and the fourth lens 60 are provided with an optical coating layer, and a refractive index of the optical coating layer is between the refractive index of the first lens 10 and the refractive index of the first adhesive layer 21 to achieve a transition of the refractive index. In other embodiments, the optical coating layer may also be an anti-reflection layer, an anti-fouling layer, etc.

In this embodiment, the lens group 100 further includes a linear polarizing layer 65. The linear polarizing layer 65 is attached on the eighth surface 64. A polarization direction of the linear polarizing layer 65 is the same as a polarization direction of the reflected polarizing layer 43, so that the image light transmitted from the reflected polarizing layer 43 can pass through the linear polarizing layer 65 to incident into the human eye E, and the stray light can be filtered.

Figure 3:
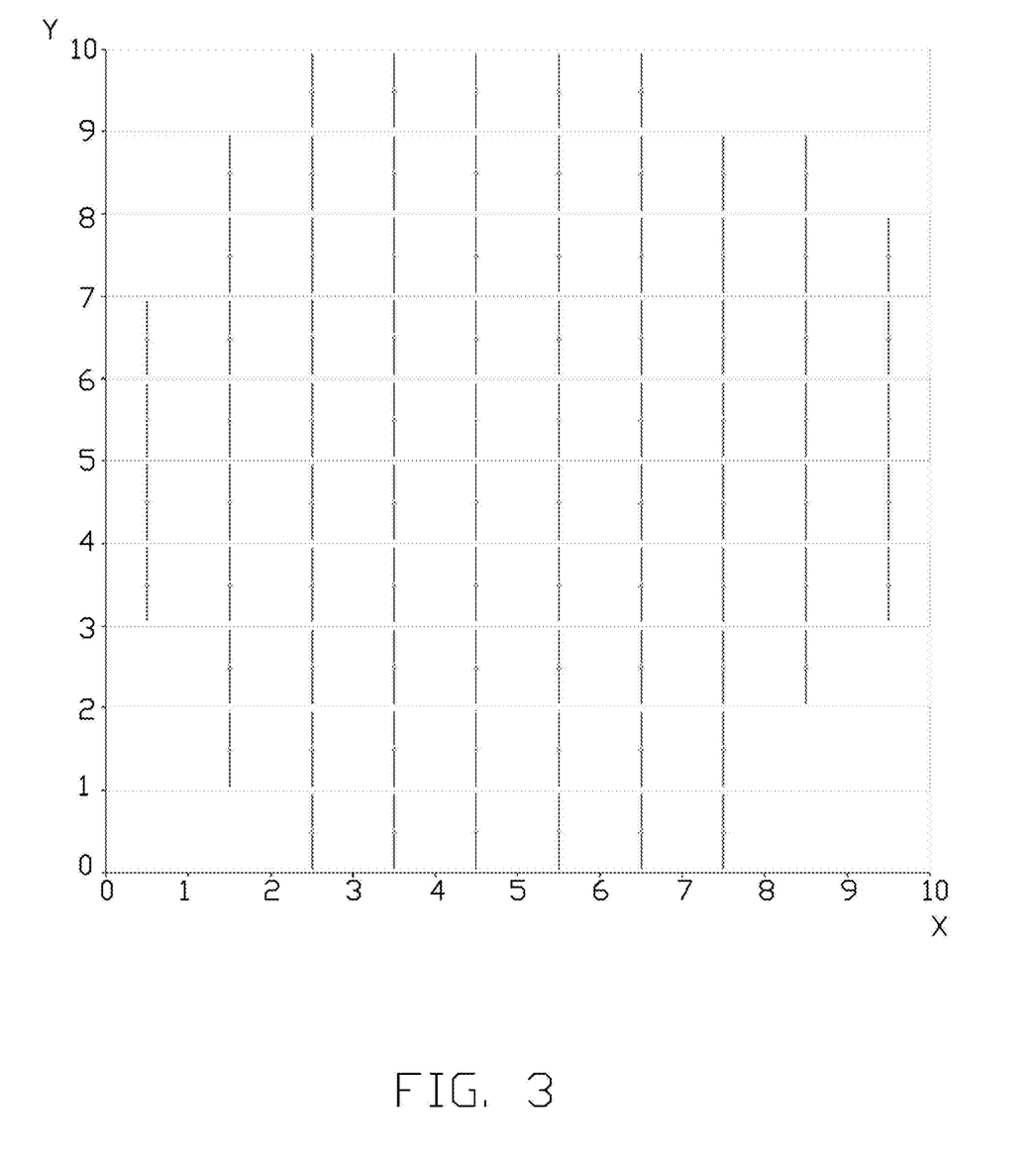
FIG. 3 is a chart of polarization directions of light on an eighth surface of the lens group of FIG. 1.
Figure 4:
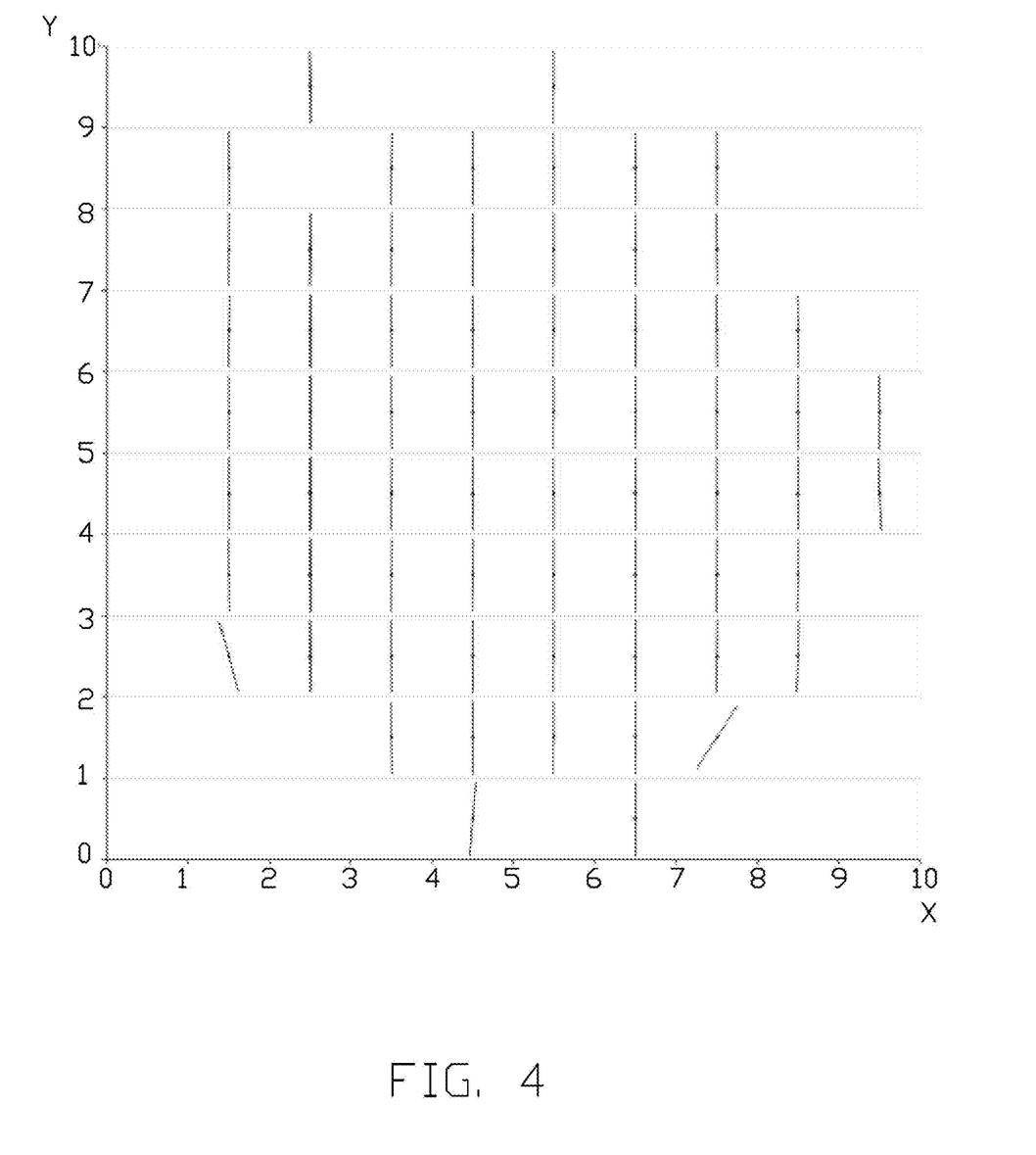
FIG. 4 is a chart of polarization directions of light on an eighth surface of a lens group according to a comparative embodiment.

In this embodiment, the eighth surface 64 is a planer surface. Specifically, FIG. 3 illustrates a chart of polarization directions of the image light emitting on the eighth surface 64 according to an embodiment of the present disclosure. FIG. 4 illustrates the chart of polarization directions of the image light emitting on an eighth surface of a lens group according to a comparative embodiment. The lens group of the comparative embodiment is similar to the lens group according to the embodiment of the present disclosure, besides that the eighth surface is a curve surface. In the FIG. 3 and FIG. 4, the transverse axis and longitudinal axis of the chart are the coordinates of a cross section of the eighth surface 64, and line segments in the chart are the polarization directions of different parts of the image light. Due to the limitation of the structure of the fourth lens 60, when the eighth surface 64 is not planar, the polarization directions of the image light at positions of the edge of the eighth surface 64 will be distorted. In other words, when the image light with the second linear polarization state emits from the reflected polarizing layer 43 passes through the third lens 50 and the fourth lens 60, the image light at the edge of the fourth lens 60 will have a polarization error, resulting in a change in the polarization direction of the image light, which reduces the brightness of the image light passing through the linear polarizing layer 65, thus affecting the user's viewing experience.

By setting the eighth surface 64 as a plane, it can be seen from FIG. 3 that the image light emits from the eighth surface 64 will not have polarization errors, thus ensuring the brightness of the image shown in the human eye E.

In this embodiment, the second surface 14, the third surface 32, the fourth surface 34, the fifth surface 52, the sixth surface 54, and the seventh surface 62 are curved surfaces raised in a direction of the first surface 12. That is, except for the first surface 12 and the eighth surface 64, the other surfaces in the lens group 100 have the same curved orientation, which facilitates the fitting process. In other embodiments, the eighth surface 64 may also be a curved surface raised in the direction of the first surface 12, as FIG. 2 shows.

A thickness of a central position of the first lens 10 is 0.2-3 mm. A thickness of a central position of the second lens 10 is 8-12 mm. A thickness of a central position of the third lens 50 is 1-4 mm. A thickness of a central position of the fourth lens 60 is 1.5-4.5 mm. Wherein, since the image light is folded in the second lens 30, the thickness of the second lens 30 is greater than the thicknesses of other lenses, thereby extending the optical path of the image light.

The lens group 100 according to the embodiment of the present disclosure is further described below in comparison with other comparative embodiments.

In a first embodiment of the present disclosure, a radius of curvature of the third surface 32 is −29 mm to −32 mm, a radius of curvature of the fourth surface 34 is −20 mm to −35 mm, a radius of curvature of the sixth surface 54 is −60 mm to −85 mm, a radius of curvature of the eighth surface 64 is −70 mm to −90 mm.

Figure 5:
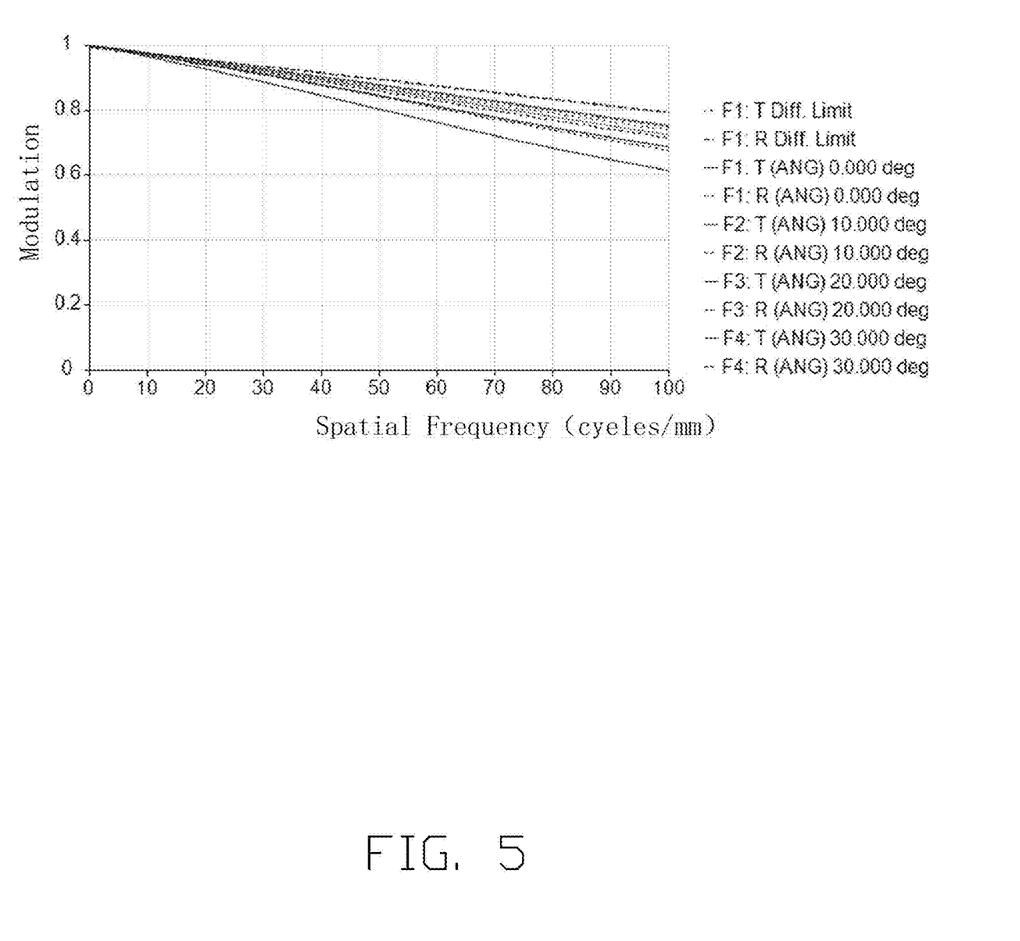
FIG. 5 is a chart of a modulation transfer function of the lens group of FIG. 1.

FIG. 5 illustrates a chart of a modulation transfer function (MTF) of the lens group 100 according to the first embodiment of the present disclosure. It can be seen that values of the MTF of the lens group 100 are larger than 0.6 at different field angles, tangential direction and sagittal direction, central and edge positions. As a result, the lens group 100 has a high MTF to achieve a resolution of 60 PPD when applied to near-to-eye display devices.

In a first comparative embodiment, a lens group only has a first lens, a second lens, and a third lens. A transflective film sets between the first lens and the second lens, a composite film sets between the second lens and the third lens. Wherein, a first surface of the first lens is a plane, a radius of curvature of a third surface of the second lens is −29 mm to −32 mm, a radius of curvature of a fourth surface of the second lens is −29 mm to −32 mm, a radius of curvature of a sixth surface of the third lens is −80 mm to −84 mm.

Figure 6:
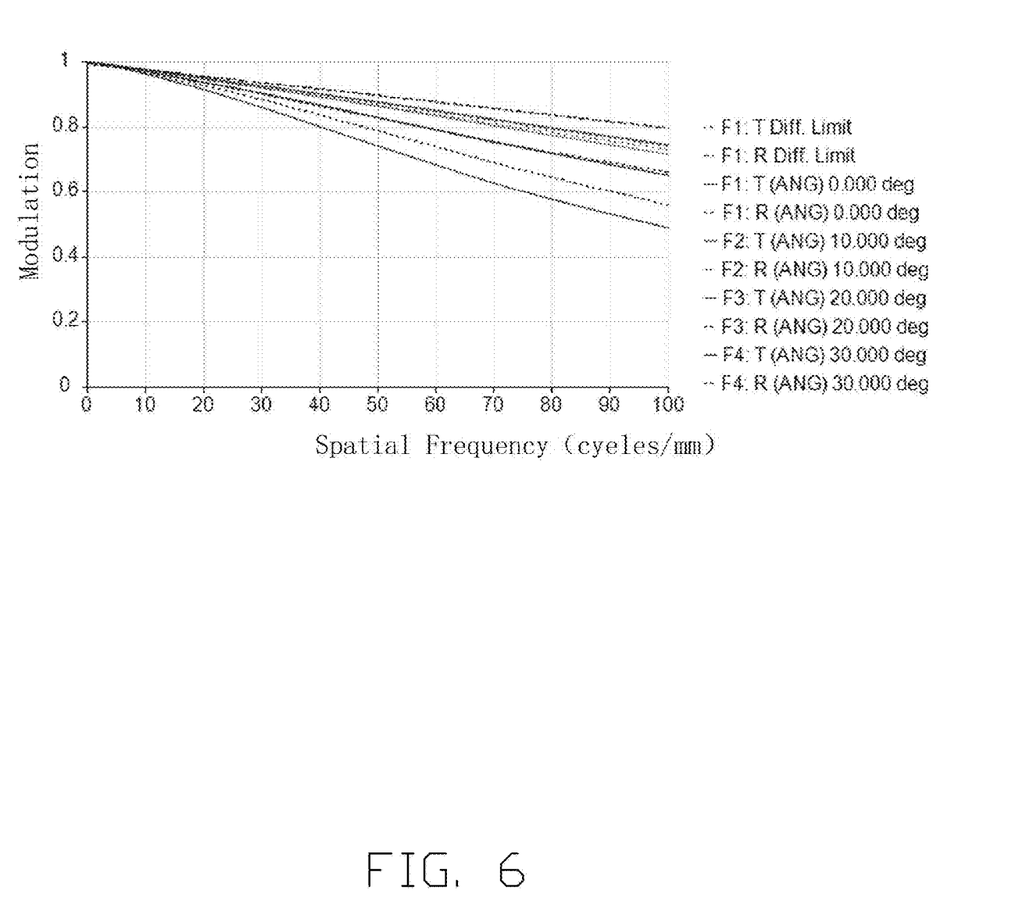
FIG. 6 is a chart of a modulation transfer function of a lens group according to a comparative embodiment.

FIG. 6 illustrates a chart of the MTF of the lens group according to the first comparative embodiment of the present disclosure. It can be seen that at a higher filed angle, the MTF of the lens group at edge positions are less than 0.6. As a result, the lens group in this embodiment cannot achieve a resolution of 60 PPD when applied to near-to-eye display devices.

In a second comparative embodiment, a lens group is provided. Different from the lens group 100 in the first embodiment, the lens group in this embodiment has a transflective film sets between the second lens and the third lens, and a composite film sets between the third lens and the fourth lens.

Figure 7:
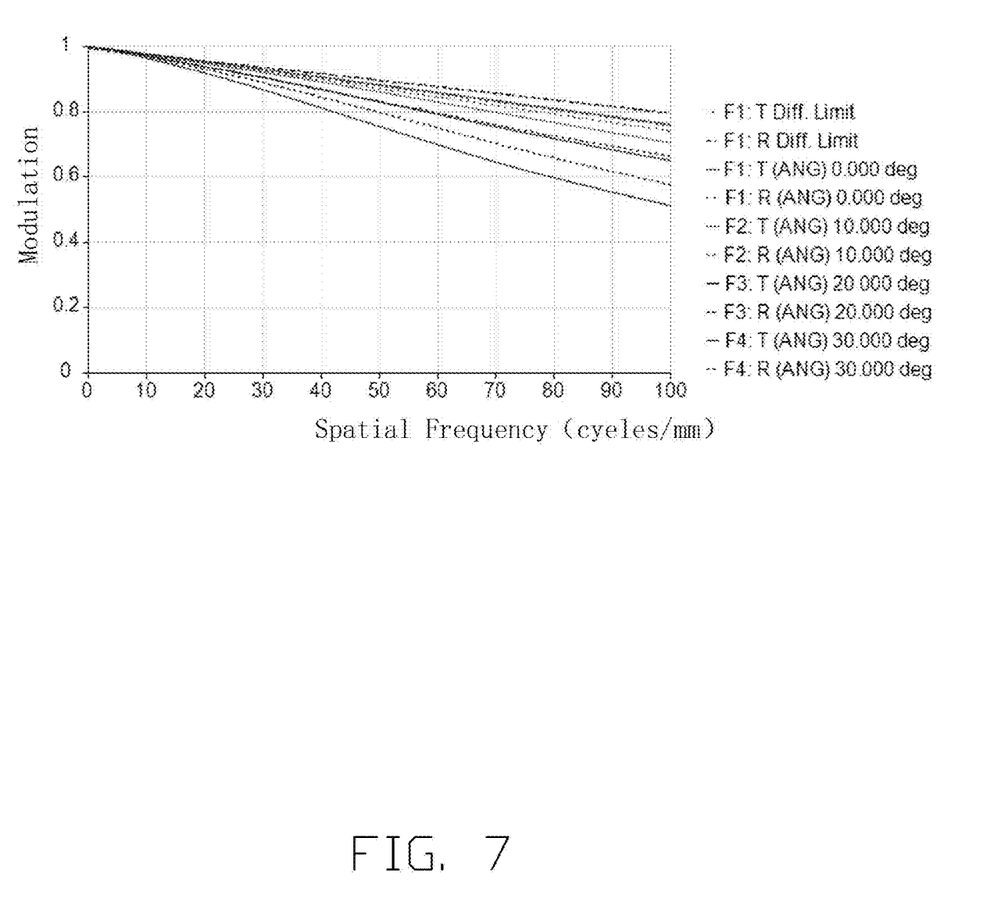
FIG. 7 is a chart of a modulation transfer function of a lens group according to another comparative embodiment.

FIG. 7 illustrates a chart of the MTF of the lens group according to the second comparative embodiment of the present disclosure. It can be seen that at a higher filed angle, the MTF of the lens group at edge positions are less than 0.6.

As a result, the lens group in this embodiment cannot achieve a resolution of 60 PPD as well when applied to near-to-eye display devices.

In a third comparative embodiment, a lens group is provided only with a first lens, a second lens and a third lens. A transflective film sets between the first lens and the second lens, and a composite film sets between the second lens and the third lens. The lens group in this embodiment is designed in simulation to achieve a high MTF, so that the lens group can achieve a resolution of 60 PPD as well when applied to near-to-eye display devices. According to the simulation, a radius of curvature of a third surface of the second lens is −10 mm to −20 mm, a radius of curvature of a fourth surface of the second lens is −10 mm to −20 mm.

Since the low values of the radius of curvature of the third lens and the fourth lens, field of view angles also become smaller at the same time. As a result, not only the transflective film and the composite film cannot be attached to the second lens in actual manufacturing process, but also the lens group is not suitable for near-to-eye display devices. Therefore, the lens group in the third comparative embodiment can only simulate a situation of using only three lenses to achieve a high MTF through simulation, and an actual product cannot be obtained.

By setting the first lens 10, the second lens 30, the third lens 50 and the fourth lens 60, and setting the transflective film 31 between the first lens 10 and the second lens 30, setting the composite film 40 between the second lens 30 and the third lens 50, the lens group 100 can achieve a high MTF with low radiuses of curvature of each lenses. So that the lens group 100 can be applied to near-to-eye display devices required for a 60 PPD, and can meet requirements of the actual production process.

Figure 8:
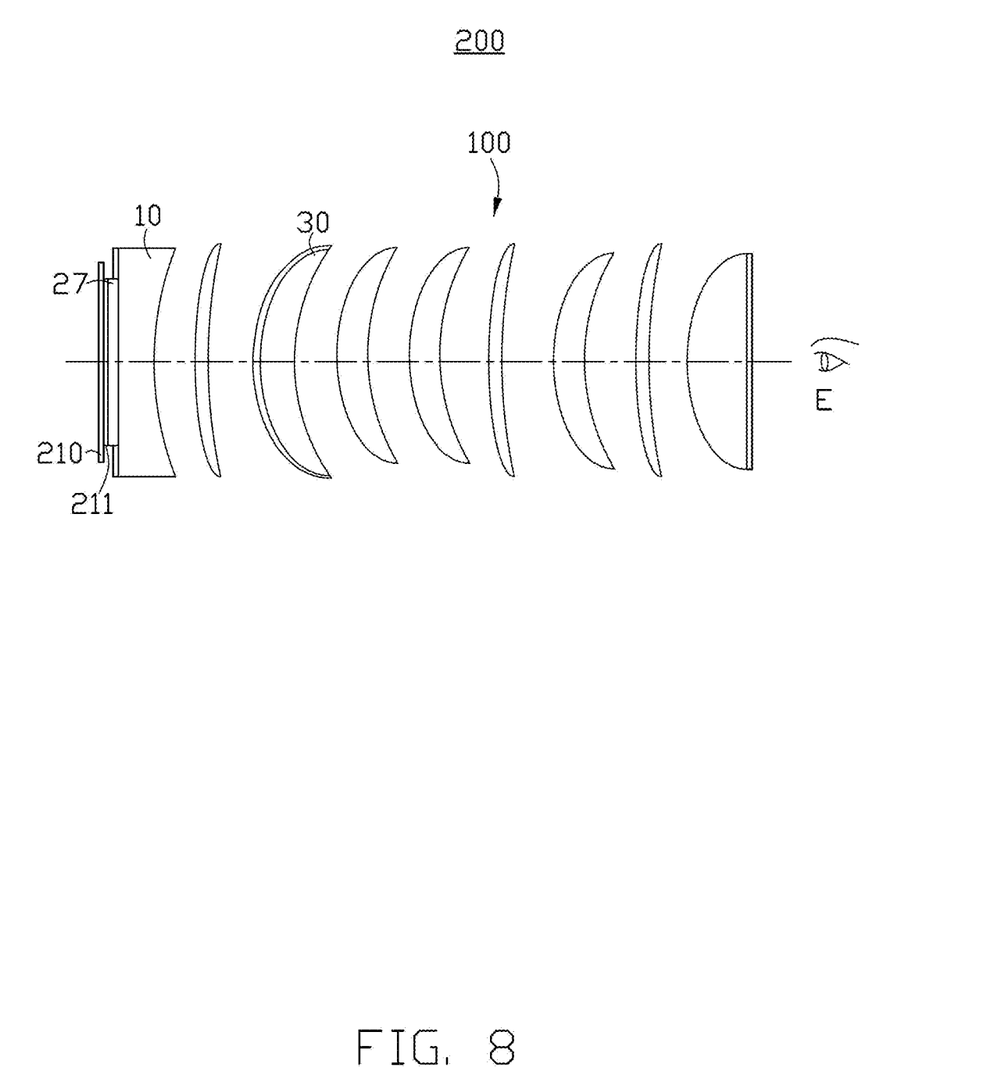
FIG. 8 illustrates an embodiment of a near-to-eye display device according to the present disclosure.

FIG. 8 illustrates a near-to-eye display device 200 according to an embodiment of the present disclosure. The near-to-eye display device 200 includes the lens group 100 above and a display panel 210. The display panel 210 sets on a side of the first lens 10 away from the second lens 30 to emit the image light to the lens group 100.

The image light emitted on the first surface 12 is a circularly polarizing light. Specifically, in order to achieve the folded optical path of the image light between the transflective film 31 and the composite film 40, the image light incident on the first surface 12 should be the circularly polarizing light. In this embodiment, a polarization film 211 can be arranged on a luminous surface of the display panel 210 to change the image light emits from the display panel 210 to the circularly polarizing light. In other embodiments, light emitting structures of the display panel 210 can be designed so that the display panel 210 can emits the circularly polarizing light directly.

In this embodiment, the display panel 210 is attached to the first surface 12. Specifically, a fourth adhesive layer 27 is arranged between the display panel 210 and the first surface 12. The fourth adhesive layer 27 can be made by transparent adhesive materials such as optical adhesives or liquid optical adhesives. In other embodiments, the display panel 210 can be attached to the first lens by other means, such as fixed shell or clasp.

In this embodiment, a resolution of the display panel 210 is 11264*6336, that is, 11K resolution, and with the lens group 100, the near-to-eye display device 200 can achieve a resolution of 60 PPD, thus achieving the resolution of the retina. In other embodiments, the resolution of the display panel 210 can be higher than 11K.

By setting the display panel 210 with the lens group 100, a high resolution of 60 PPD can be achieved on the nearto-eye display device 200. And assemble processes of the lens group 100 and the near-to-eye display device 200 is easy with a low cost.

It is to be understood, even though information and advantages of the present exemplary embodiments have been set fourth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A lens group comprising: a first lens; a transflective film; a second lens; a composite film; a third lens; and a fourth lens,
wherein:
the first lens comprises a first surface and a second surface,
the second lens comprises a third surface and a fourth surface, the third surface faces to the second surface,
the transflective film is attached to the third surface and the composite film is attached to the fourth surface; the composite film comprises a phase retardation layer and a reflective polarizing layer; the phase retardation layer is attached to the fourth surface,
the third lens comprises a fifth surface and a sixth surface, the fifth surface faces to the fourth surface, and
the fourth lens comprises a seventh surface and an eighth surface, the seventh surface faces to the sixth surface.

2. The lens group of claim 1, wherein the first surface is a planar surface, a transmittance area and a shading area are defined on the first surface; the transmittance area transmits an image light, and a shading layer sets on the shading area.

3. The lens group of claim 1 further comprising a first adhesive layer, a second adhesive layer, and a third adhesive layer, wherein the first adhesive layer is set between the first lens and the transflective layer, the second adhesive layer is set between the composite film and the third lens, and the third adhesive layer is set between the third lens and the fourth lens.

4. The lens group of claim 3, wherein a refractive index of each of the first lens, the second lens, the third lens and the fourth lens is selected from a range of 1.46-1.58; a refractive index of each of the first adhesive layer, the second adhesive layer and the second adhesive layer is selected from a range of 1.45-1.7.

5. The lens group of claim 4, wherein surfaces of the first lens, the third lens and the fourth lens are provided with an optical coating layer, a refractive index of the optical coating layer is between the refractive index of the first lens and the refractive index of the first adhesive layer.

6. The lens group of claim 1 further comprising a linear polarizing layer attached to the eighth surface, wherein a polarization direction of the linear polarizing layer is same as a polarization direction of the reflected polarizing layer.

7. The lens group of claim 6, wherein the eighth surface is a planar surface.

8. The lens group of claim 1, wherein the second surface, the third surface, the fourth surface, the fifth surface, the sixth surface and the seventh surface are curved surfaces raised to a direction of the first surface.

9. The lens group of claim 1, wherein a value of a modulation transfer function of the lens groups is larger than 0.6.

10. A near-to-eye display device comprising:
a lens group comprising a first lens; a transflective film; a second lens; a composite film; a third lens; and a fourth lens, wherein:
the first lens comprises a first surface and a second surface,
the second lens comprises a third surface and a fourth surface, the third surface faces to the second surface,
the transflective film is attached to the third surface and the composite film is attached to the fourth surface, the composite film comprises a phase retardation layer and a reflective polarizing layer, the phase retardation layer is attached to the fourth surface,
the third lens comprises a fifth surface and a sixth surface, the fifth surface faces to the fourth surface,
the fourth lens comprises a seventh surface and an eighth surface, the seventh surface faces to the sixth surface, and
a display panel on a side of the first lens away from the second lens, the display panel is configured for emitting an image light to the first surface.

11. The near-to-eye display device of claim 10, wherein the image light emitted on the first surface is a circularly polarizing light.

12. The near-to-eye display device of claim 10, wherein the display panel is attached to the first surface.

13. The near-to-eye display device of claim 10, wherein the first surface is a planar surface, a transmittance area and a shading area are defined on the first surface, the transmittance area transmits an image light, and a shading layer sets on the shading area.

14. The near-to-eye display device of claim 10, the lens group further comprising a first adhesive layer; a second adhesive layer; and a third adhesive layer, wherein the first adhesive layer is set between the first lens and the transflective layer, the second adhesive layer is set between the composite film and the third lens, and the third adhesive layer is set between the third lens and the fourth lens.

15. The near-to-eye display device of claim 14, wherein a refractive index of each of the first lens, the second lens, the third lens and the fourth lens is selected from a range of 1.46-1.58, a refractive index of each of the first adhesive layer, the second adhesive layer and the second adhesive layer is selected from a range of 1.45-1.7.

16. The near-to-eye display device of claim 15, wherein surfaces of the first lens, the third lens and the fourth lens are provided with an optical coating layer, a refractive index of the optical coating layer is between the refractive index of the first lens and the refractive index of the first adhesive layer.

17. The near-to-eye display device of claim 10, the lens group further comprising a linear polarizing layer fits to the eighth surface, wherein a polarization direction of the linear polarizing layer is same as a polarization direction of the reflected polarizing layer.

18. The near-to-eye display device of claim 17, wherein the eighth surface is a planer surface.

19. The near-to-eye display device of claim 10, wherein the second surface, the third surface, the fourth surface, the fifth surface, the sixth surface, and the seventh surface are curved surfaces raised to a direction of the first surface.

20. The near-to-eye display device of claim 10, wherein a value of a modulation transfer function of the lens groups is larger than 0.6.

* * * * *